United States Patent
Itaya (10) Patent No.: US 10,381,644 B2
(45) Date of Patent: Aug. 13, 2019

(54) NON-AQUEOUS ELECTROLYTE SECONDARY BATTERY AND STORAGE CIRCUIT USING THE SAME

(71) Applicant: Murata Manufacturing Co., Ltd., Nagaokakyo-shi, Kyoto-fu (JP)

(72) Inventor: Masaharu Itaya, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 522 days.

(21) Appl. No.: 15/134,915

(22) Filed: Apr. 21, 2016

(65) Prior Publication Data

US 2016/0233504 A1 Aug. 11, 2016

Related U.S. Application Data (63) Continuation of application No. PCT/JP2014/079181, filed on Nov. 4, 2014.

(30) Foreign Application Priority Data

Nov. 7, 2013 (JP) .................................. 2013-231195

(51) Int. Cl.
| | |
|---|---|
| H01M 4/485 | (2010.01) |
| H01G 11/08 | (2013.01) |
| H01M 4/131 | (2010.01) |
| H01M 2/16 | (2006.01) |
| H01M 4/505 | (2010.01) |
| H01M 4/525 | (2010.01) |
| H01M 10/0525 | (2010.01) |
| H01M 10/0568 | (2010.01) |
| H01M 10/0569 | (2010.01) |
| H01M 10/42 | (2006.01) |
| H01M 16/00 | (2006.01) |
| H01M 4/02 | (2006.01) |

(52) U.S. Cl.
CPC ............ *H01M 4/485* (2013.01); *H01G 11/08* (2013.01); *H01M 2/1653* (2013.01); *H01M 4/131* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 10/4264* (2013.01); *H01M 16/00* (2013.01); *H01M 2004/021* (2013.01); *H01M 2010/4292* (2013.01); *H01M 2300/0025* (2013.01); *Y02E 60/13* (2013.01)

(58) Field of Classification Search
CPC ...... H01M 4/485; H01M 4/131; H01M 4/505; H01M 4/525; H01M 2/1653; H01M 10/0525; H01M 10/0568; H01M 10/0569; H01M 10/4264; H01M 2004/021; H01M 2010/4292; H01M 2300/0025; Y02E 60/13

See application file for complete search history.

(56) References Cited

U.S. PATENT DOCUMENTS

| | | | |
|---|---|---|---|
| 7,923,152 B2 | 4/2011 | Inagaki et al. | |
| 7,924,562 B2 | 4/2011 | Soma et al. | |
| 8,482,262 B2 | 7/2013 | Norio et al. | |
| 2005/0221188 A1* | 10/2005 | Takami ................ | H01M 4/131 429/231.95 |
| 2006/0068272 A1 | 3/2006 | Norio et al. | |
| 2007/0009797 A1 | 1/2007 | Takami et al. | |
| 2007/0231693 A1 | 10/2007 | Inagaki et al. | |
| 2009/0141447 A1 | 6/2009 | Soma et al. | |
| 2010/0201326 A1 | 8/2010 | Norio et al. | |
| 2012/0235473 A1 | 9/2012 | Jiang et al. | |

FOREIGN PATENT DOCUMENTS

| | | |
|---|---|---|
| JP | 2001-351888 A | 12/2001 |
| JP | 2006120616 A | 5/2006 |
| JP | 2007273154 A | 10/2007 |
| JP | 2007311290 A | 11/2007 |
| JP | 101449419 A | 6/2009 |
| JP | 2009199793 A | 9/2009 |
| JP | 2010069922 A | 4/2010 |
| JP | 5447517 B2 | 3/2014 |
| WO | WO 2010/150679 A1 | 12/2010 |

OTHER PUBLICATIONS

International Search Report issued for PCT/JP2014/079181, dated Jan. 20, 2015.
Written Opinion of the International Searching Authority issued for PCT/JP2014/079181, dated Jan. 20, 2015.

\* cited by examiner

*Primary Examiner* — Laura Weiner
(74) *Attorney, Agent, or Firm* — Arent Fox LLP (57) ABSTRACT

A non-aqueous electrolyte secondary battery that includes a positive electrode having a positive electrode active material layer and a positive electrode current collector; a negative electrode having a negative electrode active material layer and a negative electrode current collector; a separator interposed between the positive electrode and the negative electrode; and a non-aqueous electrolyte solution, which are enclosed in an exterior material. The positive electrode active material layer includes a lithium transition metal oxide having a layered crystal structure, and the negative electrode active material layer includes a lithium titanium oxide having a spinel-type crystal structure, and having a thickness of 20.0 μm or more and 33.4 μm or less. A ratio (R) between the thickness of the positive electrode active material layer and the thickness of the negative electrode active material layer is $0.59 \leq (R) \leq 1.50$ or $0.59 \leq (R) \leq 1.14$.

20 Claims, 3 Drawing Sheets

NON-AQUEOUS ELECTROLYTE SECONDARY BATTERY AND STORAGE CIRCUIT USING THE SAME

CROSS REFERENCE TO RELATED APPLICATIONS

The present application is a continuation of International application No. PCT/JP2014/079181, filed Nov. 4, 2014, which claims priority to Japanese Patent Application No. 2013-231195, filed Nov. 7, 2013, the entire contents of each of which are incorporated herein by reference.

FIELD OF THE INVENTION

The present invention relates to a non-aqueous electrolyte secondary battery and a storage circuit using the battery, and more particularly, a non-aqueous electrolyte secondary battery that has a structure where a positive electrode layer, a negative electrode layer, a separator provided to be interposed between the positive electrode layer and the negative electrode layer, and a non-aqueous electrolyte solution are enclosed in an exterior material, and a storage circuit using the battery.

BACKGROUND OF THE INVENTION

Conventionally, for high-energy density electric storage devices as typified by lithium ion secondary batteries, sheet-like current-collecting foil (such as aluminum foil or copper foil) rolled up in the form of a roll is passed through a die coater, a comma coater, or the like to coat the current collecting foil with an active material (such as a lithium composite oxide or carbon), thereby preparing sheet-like electrodes.

Further, in order to prevent short circuits between the sheet-like electrodes in contact with each other, separators are interposed between the electrodes, the electrodes and the separators are wound or stacked as sheets to prepare electrode groups, and aluminum tubs or nickel tubs are welded as external terminal electrodes to the electrodes by a method such as ultrasonic welding so as to be electrically connected to the electrodes.

Then, the thus prepared elements composed of the electrodes, the separators, etc. are housed in an aluminum can, a sac-like exterior material composed of an aluminum laminate film, or the like, and subjected to sealing after injecting an electrolyte solution, thereby preparing electric storage devices.

Now, remarkable progress has been made on such electric storage devices, but in recent years, increased reliability of electric storage devices for cycle characteristics, and charge-discharge rate characteristics improved by lower resistance have been further required as typified by storage batteries for hybrid automobiles.

Batteries that use lithium titanium oxides for negative electrode active materials have been examined as such electric storage devices. The lithium titanium oxides for negative electrode active materials are hardly deteriorated by expansion or shrinkage of the crystal structure due to a small change in crystal lattice volume with charge and discharge, further, the reaction between the negative electrode and the electrolyte solution is inhibited because the potential for storing and releasing lithium ions is high and +1.55 on the basis of Li/Li+, and reliability for cycle characteristics and the like is known to be improved as compared with cases of using carbon such as graphite for the negative electrode active materials.

Further, as a technique for further improving high-temperature reliability, Patent Document 1 suggests a non-aqueous electrolyte lithium secondary battery basically composed of a negative electrode mainly including a spinel-type lithium titanium oxide, a positive electrode that has a higher potential than that of the spinel-type lithium titanium oxide, and an organic electrolyte solution, where the electric capacity of the negative electrode is made lower than the electric capacity of a chargeable/dischargeable region of the positive electrode. More specifically, Patent Document 1 presents a non-aqueous electrolyte lithium secondary battery which has high-temperature reliability improved by making the negative electrode capacity (mAh) lower than the positive electrode capacity (mAh).

In addition, Patent Document 2 suggests a non-aqueous electrolyte battery which has high-temperature reliability (cycle characteristics) improved by making the negative electrode capacity (mAh) higher than the positive electrode capacity (mAh), in contrast to Patent Document 1 mentioned above.

However, conventionally, batteries that use a lithium titanium oxide of spinel-type crystal structure for a negative electrode active material and a lithium transition metal oxide having a layered crystal structure for a positive electrode active material like the non-aqueous electrolyte lithium secondary battery in Patent Document 1 are known to have the problem of having cycle characteristics degraded particularly at high temperature.

On the other hand, Patent Document 2 mentions that when a positive electrode capacity ratio is made higher than a negative electrode capacity ratio, the balance in actual electric capacity between the positive electrode and the negative electrode is lost under environment at high temperature when the actual electric capacity of the negative electrode is less than the actual electric capacity of the positive electrode, because the negative electrode undergoes a larger increase in actual electric capacity with increase in temperature as compared with the positive electrode. This brings the positive electrode into a overcharge condition in spite of normal charge-discharge cycle, and results in dramatically degraded cycle characteristics (Patent Document 2, paragraph 0020).

Further, Patent Document 2 discloses high-temperature cycle characteristics improved by making the positive electrode capacity lower than the negative electrode capacity. For example, Patent Document 2 discloses a capacity maintenance ratio of 88% as a most favorable example as a result of carrying out a charge-discharge cycle test up to 300 cycles when 5C charge/1C discharge is repeated under an environment at 60° C. (Patent Document 2, Table 1).

In this regard, the lithium titanium oxide has a low packing density (3.5 g/cc), whereas the positive electrode active material having a layered crystal structure such as $LiCoO_2$ or $LiCo_{1/3}Ni_{1/3}Mn_{1/3}O_2$ has a high packing density (4.6 to 5.0 g/cc).

In addition, the capacity of the positive electrode material and the capacity of the lithium titanium oxide both represent close values (for example, the lithium transition metal oxide having a layered crystal structure such as $LiCoO_2$ or $LiCo_{1/3}Ni_{1/3}Mn_{1/3}O_2$ has a capacity of 150 to 170 mAh/g in the case of charging at 4.3 V and discharging at 2.7 V (vs. Li/Li+), and the lithium titanium oxide has a capacity of 166 mAh/g in the case of charging at 2.0 V and discharging at 1.0 V (vs. Li/Li+)).

Therefore, when a battery is prepared as described in Patent Document 2, there is a need to reduce the thickness of the positive electrode layer and increase the thickness of the negative electrode layer in order to increase the capacity of the negative electrode.

Further, in the case of such a composition, the spinel-type lithium titanium composite oxide is approximately two orders of magnitude lower in ion conductivity as compared with carbon materials for use in negative electrode active materials and lithium cobalt composite oxides (for example, $LiCoO_2$) for use in positive electrode active materials, and there is thus a bias generated between a local load associated with a charge (discharge) reaction at the positive electrode and a local load associated with a charge (discharge) reaction at the negative electrode. Therefore, it is difficult to increase the reliability of the electric storage device under an environment at a high temperature such as 85° C., and improve charge-discharge rate characteristics by lowering the resistance.

In addition, even when the positive electrode capacity is made higher than the negative electrode capacity as described in Patent Document 1, the distance between the negative electrode layer and a current collector layer is longer when the thickness of the negative electrode layer is made, for example, 40 µm or more, the spinel-type lithium titanium composite oxide is approximately two orders of magnitude lower in ion conductivity as described above, there is thus a bias generated between a local load associated with a charge (discharge) reaction at the positive electrode and a local load associated with a charge (discharge) reaction at the negative electrode, and it is difficult to increase the reliability of the electric storage device under an environment at a high temperature such as 85° C., and improve charge-discharge rate characteristics by lowering the resistance.

Patent Document 1: Japanese Patent Application Laid-Open No. 10-69922

Patent Document 2: Japanese Patent Application Laid-Open No. 2007-273154

SUMMARY OF THE INVENTION

The present invention is intended to solve the problems mentioned above, and an object of the present invention is to provide a non-aqueous electrolyte secondary battery which has high reliability even at high temperatures, and has excellent charge-discharge rate characteristics due to lowered resistance, and a highly reliable storage circuit using the battery.

In order to solve the problems mentioned above, a non-aqueous electrolyte secondary battery according to a first aspect of the present invention includes a positive electrode with a positive electrode active material layer formed on a positive electrode current collector; a negative electrode with a negative electrode active material layer formed on a negative electrode current collector; a separator provided to be interposed between the positive electrode and the negative electrode; and a non-aqueous electrolyte solution. All of these components are enclosed in an exterior material.

The positive electrode active material layer includes a lithium transition metal oxide having a layered crystal structure. The negative electrode active material layer includes a lithium titanium oxide of spinel-type crystal structure, and is 20.0 µm or more and 33.4 µm or less in thickness. The ratio between the thickness of the positive electrode active material layer and the thickness of the negative electrode active material layer is 0.59≤(thickness of positive electrode active material layer/thickness of negative electrode active material layer)≤1.50.

In addition, another non-aqueous electrolyte secondary battery according to a second aspect of the present invention includes a positive electrode with a positive electrode active material layer formed on a positive electrode current collector; a negative electrode with a negative electrode active material layer formed on a negative electrode current collector; a separator provided to be interposed between the positive electrode and the negative electrode; and a non-aqueous electrolyte solution. All of these components are enclosed in an exterior material.

The positive electrode active material layer includes a lithium transition metal oxide having a layered crystal structure. The negative electrode active material layer includes a lithium titanium oxide of spinel-type crystal structure, and is 25.0 µm or more and 33.4 µm or less in thickness. The ratio between the thickness of the positive electrode active material layer and the thickness of the negative electrode active material layer is 0.59≤(thickness of positive electrode active material layer/thickness of negative electrode active material layer)≤1.14.

In addition, a storage circuit according to the present invention is characterized in that the non-aqueous electrolyte secondary battery according to the present invention and an electric double layer capacitor are connected in parallel.

The non-aqueous electrolyte secondary battery according to the first and second aspects of the present invention provide a non-aqueous electrolyte secondary battery which has high reliability under a high-temperature environment, and has excellent charge-discharge rate characteristics due to lowered resistance. In addition, in the non-aqueous electrolyte secondary battery according to the present invention, the thickness of the negative electrode active material layer falls within the range of 20.0 µm or more or 25.0 µm or more and 33.4 µm or less, and the distance between the negative electrode active material layer and the negative electrode current collector is thus shortened. This results in improved current collection from the negative electrode active material layer, and a quicker charge-discharge reaction at the negative electrode.

In addition, in the non-aqueous electrolyte secondary battery according to the present invention, the relationship between the thickness of the positive electrode active material layer and thickness of the negative electrode active material layer falls within the range of 0.59≤(thickness of positive electrode active material layer/thickness of negative electrode active material layer)≤1.50 when the thickness of the negative electrode active material layer is made 20.0 µm or more, or the relationship between the thickness of the positive electrode active material layer and thickness of the negative electrode active material layer falls within the range of 0.59≤(thickness of positive electrode active material layer/thickness of negative electrode active material layer)≤1.14 when the thickness of the negative electrode active material layer is made 25.0 µm or more. This makes it possible to improve the current collection from the positive electrode active material layer and the negative electrode active material layer to the current collectors, and reduce and approximate the local load associated with the charge (discharge) reaction at the positive electrode and the local load associated with the charge (discharge) reaction at the negative electrode, and makes it possible to provide a non-aqueous electrolyte secondary battery which has high reliability under an environment at a higher temperature such as, for example, 85° C., and has excellent charge-discharge rate characteristics due to lowered resistance.

More specifically, the electrical conductivity of the positive electrode and the electrical conductivity of the negative electrode are approximated (to electrical conductivity of positive electrode≈electrical conductivity of negative electrode) to reduce the local load associated with the electrochemical reactions, and thus improve reliability.

In addition, in the storage circuit according to the present invention, the non-aqueous electrolyte secondary battery configured as described above according to the present invention and the electric double layer capacitor are connected in parallel, and the non-aqueous electrolyte secondary battery according to the present invention has performance hardly degraded as described above. Thus, when the non-aqueous electrolyte secondary battery and the electric double layer capacitor are connected in parallel, the configured storage circuit (that is, the storage device with the non-aqueous electrolyte secondary battery and electric double layer capacitor connected in parallel) also has reliability improved dramatically.

In addition, the non-aqueous electrolyte secondary battery according to the present invention and the electric double layer capacitor which uses a common organic solvent are close in working voltage region, thus making it possible to simplify the configuration of a control circuit. Also, the need to consider the backflow prevention for current is eliminated, thus making it possible to significantly reduce the number of parts, and thus making it possible to provide a highly reliable storage circuit at low cost.

DETAILED DESCRIPTION OF THE INVENTION

A non-aqueous electrolyte secondary battery according to the present invention is formed in a way that a positive electrode with a positive electrode active material layer formed on a positive electrode current collector and a negative electrode with a negative electrode active material layer formed on a negative electrode current collector are opposed with a separator interposed therebetween for preventing a short circuit between the electrodes in contact with each other, and enclosed along with a non-aqueous electrolyte solution in an exterior material.

The positive electrode active material layer includes a lithium transition metal oxide that has a layered crystal structure, whereas the negative electrode active material layer includes a lithium titanium oxide that has a spinel-type crystal structure.

Further, the thickness of the negative electrode active material layer is made 20.0 μm or more and 33.4 μm or less.

In addition, the relationship between the thickness of the positive electrode active material layer and the thickness of the negative electrode active material layer is adapted to meet the requirement of 0.59≤(thickness of positive electrode active material layer/thickness of negative electrode active material layer)≤1.14.

For the non-aqueous electrolyte secondary battery according to the present invention, as the positive electrode, for example, an electrode is used which is obtained by forming, on a current collector (positive electrode current collector) of aluminum foil or the like, a combination layer including a lithium transition metal oxide having a layered crystal structure, for example, a lithium composite oxide such as $LiCoO_2$ or $LiCo_{1/3}Ni_{1/3}Mn_{1/3}O_2$ as a positive electrode active material layer.

In addition, for the non-aqueous electrolyte secondary battery according to the present invention, as the negative electrode, for example, an electrode is used which is obtained by forming, on a current collector (negative electrode current collector) of aluminum foil or the like, a combination layer including a lithium titanium oxide of spinel-type crystal structure as a negative electrode active material layer.

In addition, as the separator, a variety of known materials can be used such as, for example, a porous sheet-like material of polyamideimide.

In addition, for example, 1 mol/L of $LiPF_6$ dissolved in a mixed solvent of propylene carbonate can be used as the electrolyte solution.

Besides, electrolyte solutions can be used, such as an electrolyte selected from $LiPF_6$, $LiBF_4$, and LiTFSI or a mixed electrolyte thereof dissolved in an organic solvent selected from dimethyl carbonate, diethyl carbonate, methylethyl carbonate, propylene carbonate, acetonitrile, ethyl propionate, and methyl propionate which are commonly used in lithium ion secondary batteries, or a mixed organic solvent thereof.

In addition, electrolyte solutions can be also used, such as the above-mentioned organic solvents and electrolytes dissolved in an ionic liquid selected from 1-ethyl-3-methylimidazolium tetrafluoroborate and 1-ethyl-3methylimidazolium bis(trifluoromethane sulfonyl), or mixed ionic liquid thereof.

In addition, in the non-aqueous electrolyte secondary battery according to the present invention, the charge cut-off voltage is desirably made 2.75 V, preferably 2.60 V, and more preferably 2.50 V, whereas the discharge cut-off voltage is desirably made 1.00 V, preferably 1.25 V, and more preferably 1.50 V.

Connecting the non-aqueous electrolyte secondary battery and an electric double layer capacitor in parallel like the storage circuit according to the present invention can provide a device (storage device) which has both a large-current characteristic and a large capacity, and has high reliability.

It is to be noted that it has been conventionally known that connecting a non-aqueous electrolyte secondary battery and an electric double layer in parallel can achieve both a large-current characteristic and a large capacity. However, the electric double layer capacitor has performance rarely degraded because of giving rise to only a simple physical phenomenon, while the non-aqueous electrolyte secondary battery is more likely to have performance degraded as compared with the electric double layer capacitor, due to change of a substance by an electrochemical reaction. Therefore, when a common non-aqueous electrolyte secondary battery and electric double layer capacitor are connected in parallel, the circuit of the non-aqueous electrolyte secondary battery and electric double layer capacitor connected in parallel will also have performance degraded, depending on the performance degradation of the non-aqueous electrolyte secondary battery.

In contrast, the non-aqueous electrolyte secondary battery according to the present invention has performance hardly degraded as described above, and thus also has reliability increased dramatically in a circuit where the non-aqueous electrolyte secondary battery according to the present invention and an electric double layer capacitor are connected in parallel.

Features of the present invention will be described in more detail below with reference to an embodiment of a non-aqueous electrolyte secondary battery according to an embodiment (Embodiment 1) of the present invention.

[Embodiment 1]
<Preparation of Positive Electrode>

A lithium cobalt composite oxide (LCO) represented by the composition formula $LiCoO_2$, carbon as a conducting agent, and polyvinylidene fluoride (PVDF) as a binder were combined to be 90:7:3 in ratio by weight, and mixed with N-methyl-2-pyrrolidone (NMP), thereby preparing positive electrode active material slurry.

Then, this positive electrode active material slurry was applied to aluminum foil as a positive electrode current collector so as to reach a predetermined weight, dried, and then subjected to rolling by roll pressing to form a positive electrode active material layer on the positive electrode current collector.

Then, the positive electrode current collector with the positive electrode active material layer formed was subjected to punching so that the plane area was 3 cm² (a rectangular shape of 20 mm in vertical dimension and 15 mm in horizontal dimension), thereby preparing a positive electrode. It is to be noted that the thickness was adjusted by the roll pressing so that the positive electrode active material layers according to Examples 1 to 18 and Comparative Examples 1 to 3 were all 3.3 g/cm³ in packing density.

Table 1A shows therein the weight (the weight per 1 cm² of the positive electrode current collector) of the positive electrode active material (positive electrode combination) for samples (positive electrodes) according to Examples 1 to 18 and Comparative Examples 1 to 3 prepared in the way described above.

TABLE 1A

| Weight of Positive Electrode Active Material | | |
|---|---|---|
| 6.47 (mg/cm²) | 8.11 (mg/cm²) | 9.4 (mg/cm²) |
| Sample of Example 1 | Sample of Example 2 | Sample of Example 3 |
| Sample of Example 4 | Sample of Example 5 | Sample of Example 6 |
| Sample of Example 7 | Sample of Example 8 | Sample of Example 9 |
| Sample of Example 10 | Sample of Example 11 | Sample of Example 12 |

TABLE 1A-continued

| Weight of Positive Electrode Active Material | | |
|---|---|---|
| 6.47 (mg/cm²) | 8.11 (mg/cm²) | 9.4 (mg/cm²) |
| Sample of Comparative Example 1 | Sample of Comparative Example 2 | Sample of Comparative Example 3 |
| Sample of Example 13 | Sample of Example 14 | Sample of Example 15 |
| Sample of Example 16 | Sample of Example 17 | Sample of Example 18 |

In addition, Table 1B shows therein the weight (the weight (mg) per 1 cm² of the positive electrode current collector) of the positive electrode active material (positive electrode combination) for samples (positive electrodes) according to Examples 19 to 24 and a sample (positive electrode) according to Comparative Example 4, which were prepared in the same way as in the case of the samples according to Examples 1 to 18 and Comparative Examples 1 to 3. It is to be noted that the thickness was adjusted by the roll pressing so that the positive electrode active material layers according to Examples 19, 20, 21, 22, 23, and 24, and Comparative Example 4 were respectively 3.58 g/cm³, 3.08 g/cm³, 3.33 g/cm³, 3.41 g/cm³, 3.27 g/cm³, 3.28 g/cm³, and 3.33 g/cm³ in packing density.

TABLE 1B

| Weight of Positive Electrode Active Material | | | | | | |
|---|---|---|---|---|---|---|
| 4.22 (mg/cm²) | 7.02 (mg/cm²) | 10.00 (mg/cm²) | 6.76 (mg/cm²) | 12.56 (mg/cm²) | 16.49 (mg/cm²) | 11.10 (mg/cm²) |
| Example 19 | Example 20 | Example 21 | Example 22 | Example 23 | Example 24 | Comparative Example 4 |

<Preparation of Negative Electrode>

For the samples according to Examples 1, 2, 3, 4, 5, and 6, a spinel-type lithium titanium composite oxide represented by $Li_4Ti_5O_{12}$ as a negative electrode active material, and PVDF as a binder were combined to be 97:3 in ratio by weight, and mixed with NMP, thereby preparing negative electrode active material slurry.

In addition, for the samples according to Examples 7, 8, and 9, a spinel-type lithium titanium composite oxide represented by $Li_4Ti_5O_{12}$ as a negative electrode active material, and PVDF as a binder were combined to be 95:5 in ratio by weight, and mixed with NMP, thereby preparing negative electrode active material slurry.

In addition, for the samples according to Examples 10, 11, and 12 and the samples according to Comparative Examples 1, 2, and 3, a spinel-type lithium titanium composite oxide represented by $Li_4Ti_5O_{12}$ as a negative electrode active material, and PVDF as a binder were combined to be 90:10 in ratio by weight, and mixed with NMP, thereby preparing negative electrode active material slurry.

In addition, for the samples according to Examples 13, 14, and 15, a spinel-type lithium titanium composite oxide represented by $Li_4Ti_5O_{12}$ as a negative electrode active material, carbon as a conducting agent, and PVDF as a binder were combined to be 92:3:5 in ratio by weight, and mixed with NMP, thereby preparing negative electrode active material slurry.

Furthermore, for the samples according to Examples 16, 17, and 18, a spinel-type lithium titanium composite oxide represented by $Li_4Ti_5O_{12}$ as a negative electrode active material, carbon as a conducting agent, and PVDF as a binder were combined to be 83:7:10 in ratio by weight, and mixed with NMP, thereby preparing negative electrode active material slurry.

Then, each negative electrode active material slurry was applied to aluminum foil as a negative electrode current collector so as to reach a predetermined weight, dried, and then subjected to rolling by roll pressing to form a negative electrode active material layer on the negative electrode current collector. Then, the negative electrode current collector with the negative electrode active material layer formed was subjected to punching so that the plane area was 3 cm² (a rectangular shape of 20 mm in vertical dimension and 15 mm in horizontal dimension), thereby preparing negative electrodes for the samples according to Examples 1 to 24 and Comparative Examples 1 to 4. It is to be noted that the thickness was adjusted by the roll pressing so that the negative electrode active material layers according to Examples 1 to 8 and Comparative Examples 1 to 3 were all 2.0 g/cm³ in packing density.

Table 2A shows therein the weight of the negative electrode active material constituting each negative electrode prepared, the thickness of the negative electrode active material layer, and the relationship between the thickness of the negative electrode active material layer and the thickness of the positive electrode active material layer (thickness of positive electrode active material layer/thickness of negative electrode active material layer).

TABLE 2A

| Sample | Weight of Negative Electrode Active Material Layer (mg/cm²) | Thickness of Negative Electrode Active Material Layer (μm) | Thickness of Positive Electrode Active Material Layer/ Thickness of Negative Electrode Active Material Layer |
|---|---|---|---|
| Example 1 | 5.24 | 26.2 | 0.75 |
| Example 2 |  | 26.2 | 0.94 |
| Example 3 |  | 26.2 | 1.09 |
| Example 4 | 6.67 | 33.4 | 0.59 |
| Example 5 |  | 33.4 | 0.74 |
| Example 6 |  | 33.4 | 0.85 |
| Example 7 | 4.81 | 25 | 0.78 |
| Example 8 |  | 25 | 0.98 |
| Example 9 |  | 25 | 1.14 |
| Example 10 | 4.97 | 25 | 0.78 |
| Example 11 |  | 25 | 0.98 |
| Example 12 |  | 25 | 1.14 |
| Comparative Example 1 | 7.55 | 40 | 0.49 |
| Comparative Example 2 |  | 40 | 0.62 |
| Comparative Example 3 |  | 40 | 0.71 |
| Example 13 | 5.34 | 27.8 | 0.71 |
| Example 14 |  | 27.8 | 0.88 |
| Example 15 |  | 27.8 | 1.03 |
| Example 16 | 5.10 | 25 | 0.78 |
| Example 17 |  | 25 | 0.98 |
| Example 18 |  | 25 | 1.14 |

In addition, Table 2B shows therein the weight (the weight (mg) per 1 cm² of the negative electrode current collector) of the negative electrode active material, the thickness of the negative electrode active material layer, and the relationship between the thickness of the negative electrode active material layer and the thickness of the positive electrode active material layer (thickness of positive electrode active material layer/thickness of negative electrode active material layer) for samples according to Examples 19 to 24 and a sample according to Comparative Example 4, which were prepared in the same way as in the case of the samples according to Examples 1 to 18 and Comparative Examples 1 to 3 in Table 2A. It is to be noted that the thickness was adjusted by the roll pressing so that the negative electrode active material layers according to Examples 19, 20, 21, 22, 23, and 24, and Comparative Example 4 were respectively 1.80 g/cm³, 2.09 g/cm³, 2.00 g/cm³, 1.86 g/cm³, 2.00 g/cm³, 2.00 g/cm³, and 2.00 g/cm³ in packing density.

TABLE 2B

| Sample | Weight of Negative Electrode Active Material Layer (mg/cm²) | Thickness of Negative Electrode Active Material Layer (μm) | Thickness of Positive Electrode Active Material Layer/ Thickness of Negative Electrode Active Material Layer |
|---|---|---|---|
| Example 19 | 3.60 | 20.0 | 0.59 |
| Example 20 | 4.18 | 20.0 | 1.14 |
| Example 21 | 4.00 | 20.0 | 1.50 |
| Example 22 | 6.20 | 33.4 | 0.59 |
| Example 23 | 6.67 | 33.4 | 1.15 |
| Example 24 | 6.67 | 33.4 | 1.50 |
| Comparative Example 4 | 9.10 | 45.5 | 0.73 |

<Preparation of Non-Aqueous Electrolyte Solution>

In this embodiment, 1 mol/L of $LiPF_6$ was dissolved in a mixed solvent of propylene carbonate to prepare a non-aqueous electrolyte solution.

<Preparation of Non-Aqueous Electrolyte Secondary Battery>

Figure 1:
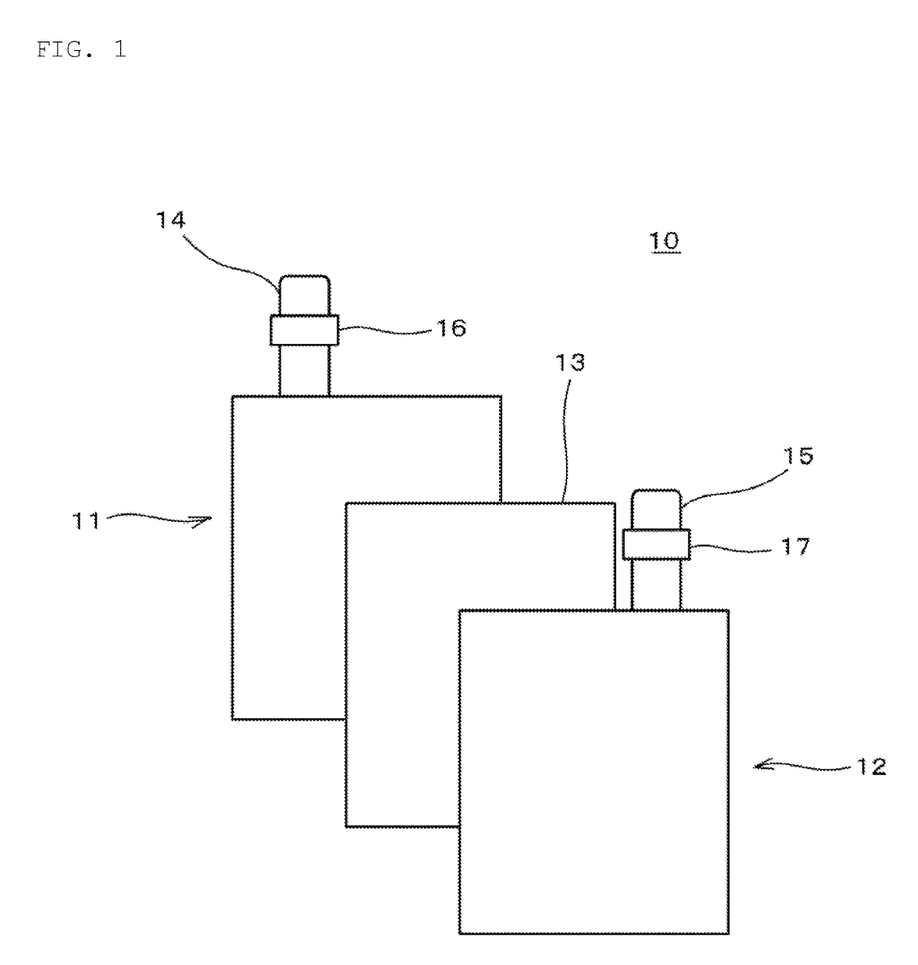
FIG. 1 is an exploded perspective view illustrating a battery element of a non-aqueous electrolyte secondary battery (lithium ion secondary battery) according to an embodiment (Embodiment 1) of the present invention, that is, a battery element including a positive electrode, a negative electrode, and a separator.

As shown in FIG. 1, a positive electrode 11 prepared by the method mentioned above was provided with a lead tab 14, whereas a negative electrode 12 was provided with a lead tab 15.

Then, the positive electrode 11 and the negative electrode 12 were stacked with a porous separator 13 (air permeability: 10 sec./100 cc, film thickness: 24 μm) of polyamideimide interposed therebetween, thereby preparing a battery element 10 including the positive electrode 11, the negative electrode 12, and the separator 13.

Figure 2:
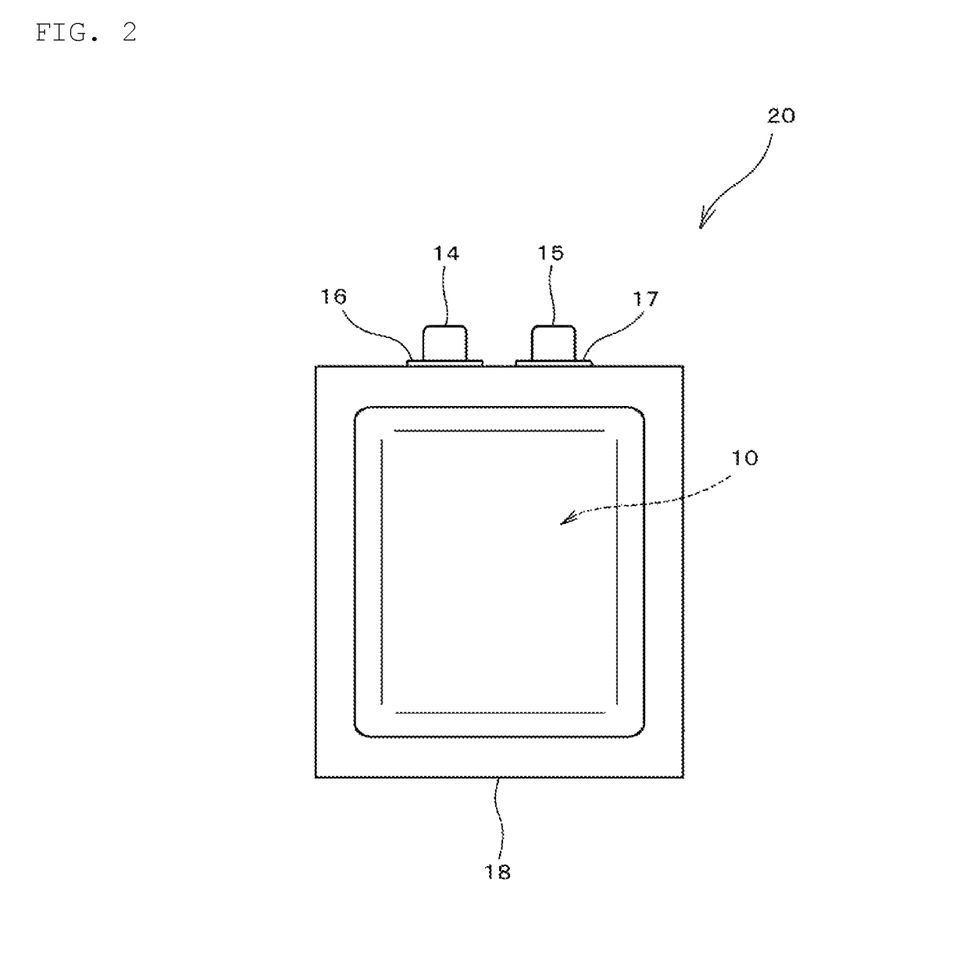
FIG. 2 is a perspective view illustrating the appearance configuration of the non-aqueous electrolyte secondary battery (lithium ion secondary battery) according to Embodiment 1 of the present invention.

Then, after attaching a sealant 16 and a sealant 17 respectively to the lead tab 14 and the lead tab 15, the battery element (stacked body) 10 was housed in an exterior material 18 of a laminate film including an aluminum layer as an intermediate layer between resin layers as shown in FIG. 2. Thereafter, the non-aqueous electrolyte solution prepared by the method mentioned above was injected into the interior of the exterior material 18, and an opening of the exterior material 18 was then sealed, thereby preparing a non-aqueous electrolyte secondary battery 20.

Thus, non-aqueous electrolyte secondary batteries according to sample numbers 1 to 18 and Comparative Examples 1 to 3 in Table 3A were obtained with the use of the positive electrodes and negative electrodes according to Examples 1 to 18 and Comparative Examples 1 to 3 in Tables 1A and 2A.

In addition, non-aqueous electrolyte secondary batteries according to sample numbers 19 to 24 and Comparative Example 4 in Table 3B were obtained by a similar method with the use of the positive electrodes and negative electrodes according to Examples 19 to 24 and Comparative Example 4 in Tables 1B and 2B.

It is to be noted that the exterior material 18 is not limited to a sac-like material obtained with the use of a laminate film as described above, but it is possible to use materials in various forms that are capable of having the battery element sealed along with the non-aqueous electrolyte solution, and it is also possible to use a material in the form of a can, for example.

For the samples (non-aqueous electrolyte secondary batteries) according to Examples 1 to 18 and Examples 19 to 24 and the samples (non-aqueous electrolyte secondary batteries) according to Comparative Examples 1 to 3 and Comparative Example 4, prepared in the way described above, a discharge rate test and a high-temperature cycle test were carried out by the methods described below.

<Discharge Rate Test>

(1) Each sample (non-aqueous electrolyte secondary battery) was subjected to constant-current charging with a current of 2.0 mA under an atmosphere at a temperature of 25° C., and then subjected to constant-voltage charging with a voltage of 2.50 V until the charging current reached 0.10 mA. Thereafter, the sample was subjected to constant-current discharging with a current of 2.0 mA until the voltage reached 1.50 V, and the capacity (discharged capacity A) (mAh) was measured.

(2) Next, each battery (sample) was subjected to constant-current charging with a current of 2.0 mA under an atmosphere at a temperature of 25° C., and then subjected to constant-voltage charging with a voltage of 2.50 V until the charging current reached 0.10 mA. Thereafter, the sample was subjected to constant-current discharging with a current of 100 mA until the voltage reached 1.50 V, and the capacity (discharged capacity B) (mAh) was measured.

Then, from the discharged capacity A measured in the foregoing (1) and the discharged capacity B measured in the foregoing (2), the discharged capacity maintenance ratio was obtained in accordance with the following formula, and regarded as an indication of discharge rate characteristics.

Discharged Capacity Maintenance Ratio (%)=(Discharged Capacity $B$/Discharged Capacity $A$)×100

The results are shown in Table 3A and Table 3B.

<High-Temperature Rapid Charge-Discharge Cycle Test>

Under an atmosphere at a temperature of 85° C., constant-current charging with a current of 20 mA until the voltage reached 2.50 V, and then constant-current discharging with a current of 20 mA until the voltage reached 1.50 V were carried out as 1 cycle.

Then, this cycle was conducted up to 1000 cycles, and from the value of a discharged capacity X in the first cycle and a discharged capacity Y in the 1000 cycles, the capacity maintenance ratio (%) after 1000 cycles in the high-temperature rapid charge-discharge cycle test was obtained in accordance with the following formula, and regarded as an indication of high-temperature rapid charge-discharge cycle characteristics.

Capacity Maintenance Ratio (%) after 1000 cycles= (Discharged Capacity $Y$ in 1000 Cycles/Discharged Capacity $X$ in First Cycle)×100

Tables 3A and 3B show therein the capacity maintenance ratios after the 1000 cycles, which were measured for each sample in this way.

TABLE 3A

| Sample | *Thickness Ratio between Negative and Positive Electrode Active Material Layers | Thickness of Negative Electrode Active Material Layer (μm) | Discharged Capacity A at 2 mA (mAh) | Discharged Capacity B at 100 mA (mAh) | B/A | Capacity Maintenance Ratio after 1000 cycles |
|---|---|---|---|---|---|---|
| Example 1 | 0.75 | 26.2 | 2.01706 | 0.478409 | 23.7% | 79.5% |
| Example 2 | 0.94 | 26.2 | 2.406322 | 0.526977 | 21.9% | 80.9% |
| Example 3 | 1.09 | 26.2 | 2.471996 | 0.499394 | 20.2% | 90.1% |
| Example 4 | 0.59 | 33.4 | 1.990517 | 0.433315 | 21.8% | 76.3% |
| Example 5 | 0.74 | 33.4 | 2.572467 | 0.532213 | 20.7% | 77.2% |
| Example 6 | 0.85 | 33.4 | 2.990535 | 0.546495 | 18.3% | 78.3% |
| Example 7 | 0.78 | 25 | 1.991554 | 0.429283 | 21.6% | 79.9% |
| Example 8 | 0.98 | 25 | 2.301468 | 0.53615 | 23.3% | 88.3% |
| Example 9 | 1.14 | 25 | 2.280151 | 0.474995 | 20.8% | 95.2% |
| Example 10 | 0.78 | 25 | 1.995397 | 0.320529 | 16.1% | 79.8% |
| Example 11 | 0.98 | 25 | 2.183691 | 0.415537 | 19.0% | 86.8% |
| Example 12 | 1.14 | 25 | 2.219524 | 0.360809 | 16.3% | 94.4% |
| Comparative Example 1 | 0.49 | 40 | 2.05869 | 0.219702 | 10.7% | 75.6% |
| Comparative Example 2 | 0.62 | 40 | 2.541503 | 0.286495 | 11.3% | 75.4% |
| Comparative Example 3 | 0.71 | 40 | 2.963223 | 0.30806 | 10.4% | 78.1% |
| Example 13 | 0.71 | 27.8 | 2.00845 | 0.410974 | 20.5% | 80.1% |
| Example 14 | 0.88 | 27.8 | 2.37136 | 0.468901 | 19.8% | 80.7% |
| Example 15 | 1.03 | 27.8 | 2.439473 | 0.449913 | 18.4% | 90.6% |
| Example 16 | 0.78 | 25 | 1.997114 | 0.445408 | 22.3% | 81.0% |
| Example 17 | 0.98 | 25 | 2.021324 | 0.42941 | 21.2% | 91.6% |
| Example 18 | 1.14 | 25 | 2.023554 | 0.43255 | 21.4% | 97.3% |

*Thickness of Positive Electrode Active Material Layer/Thickness of Negative Electrode Active Material Layer

TABLE 3B

| Sample | *Thickness Ratio between Negative and Positive Electrode Active Material Layers | Thickness of Negative Electrode Active Material Layer (μm) | Discharged Capacity A at 2 mA (mAh) | Discharged Capacity B at 100 mA (mAh) | B/A | Capacity Maintenance Ratio after 1000 cycles |
|---|---|---|---|---|---|---|
| Example 19 | 0.59 | 20.0 | 1.31 | 0.262712 | 20.1% | 87.4% |
| Example 20 | 1.14 | 20.0 | 1.83 | 0.421826 | 23.1% | 90.2% |
| Example 21 | 1.50 | 20.0 | 1.72 | 0.411281 | 23.9% | 88.4% |
| Example 22 | 0.59 | 33.4 | 2.10 | 0.482569 | 23.0% | 91.9% |
| Example 23 | 1.15 | 33.4 | 2.87 | 0.598462 | 20.9% | 93.2% |
| Example 24 | 1.50 | 33.4 | 2.92 | 0.452198 | 14.7% | 86.8% |
| Comparative Example 4 | 0.73 | 45.5 | 3.48 | 0.302112 | 8.6% | 12.2% |

*Thickness of Positive Electrode Active Material Layer/Thickness of Negative Electrode Active Material Layer As shown in Table 3A, in the case of the samples according to Comparative Examples 1 to 3 which fail to meet the requirements of the present invention, it has been confirmed that either the capacity maintenance ratio after the 1000 cycles or the discharge rate characteristics is/are low (the value of discharge capacity B/discharge capacity A is low in the case of the discharge rate characteristics).

In contrast, as shown in Table 3A, in the case of the samples according to the examples of the present invention (the samples according to Examples 1 to 18) where the thickness of the negative electrode active material layer falls within the range of 25.0 μm or more and 33.4 μm or less, and the ratio between the thickness of the positive electrode active material layer and the thickness of the negative electrode active material layer falls within the range of 0.59≤(thickness of positive electrode active material layer/thickness of negative electrode active material layer)≤1.14, it has been confirmed that both favorable discharge rate characteristics and high-temperature rapid charge-discharge cycle characteristics can be achieved at the same time.

This is because the negative electrode active material layer made 25.0 μm or more and 33.4 μm or less in thickness results in the reduced distance between the negative electrode active material layer and the negative electrode current collector, thereby resulting in improved current collection from the negative electrode active material layer to the negative electrode current collector, and thus leading to a quicker charge-discharge reaction at the negative electrode, and because the ratio between the thickness of the positive electrode active material layer and the thickness of the negative electrode active material layer within the range of 0.59≤(thickness of positive electrode active material layer/thickness of negative electrode active material layer)≤1.14 makes it possible to improve the current collection from the positive electrode active material layer and the negative electrode active material layer to the current collectors, and reduce and approximate the local load associated with the charge (discharge) reaction at the positive electrode and the local load associated with the charge (discharge) reaction at the negative electrode.

In addition, as shown in Table 3B, in the case of the sample according to Comparative Example 4 where the thickness of the negative electrode active material is 45.5 μm beyond the scope of the present invention, it has been confirmed that even when the ratio between the thickness of the positive electrode active material layer and the thickness of the negative electrode active material layer (thickness of positive electrode active material layer/thickness of negative electrode active material layer) is 0.73 within the scope of the present invention, the discharge rate characteristics are degraded (the value of discharged capacity B/discharged capacity A is low), and the capacity maintenance ratio after the 1000 cycles is also low (the high-temperature rapid discharge cycle characteristics are degraded).

In contrast, as shown in Table 3B, in the case of the samples according to the examples of the present invention (the samples according to Examples 19 to 24) where the thickness of the negative electrode active material layer falls within the range of 20.0 μm or more and 33.4 μm or less, and the ratio between the thickness of the positive electrode active material layer and the thickness of the negative electrode active material layer falls within the range of 0.59≤(thickness of positive electrode active material layer/thickness of negative electrode active material layer)≤1.50, it has been confirmed that both favorable discharge rate characteristics and high-temperature rapid charge-discharge cycle characteristics can be achieved at the same time.

Therefore, the present invention makes it possible to provide a non-aqueous electrolyte secondary battery which has excellent reliability under a high-temperature environment such as, for example, 85° C., and has charge-discharge rate characteristics improved by lowering the resistance.

[Embodiment 2]

In Embodiment 2 herein, the configuration of a storage circuit using a non-aqueous electrolyte secondary battery according to the present invention will be described.

Figure 3:
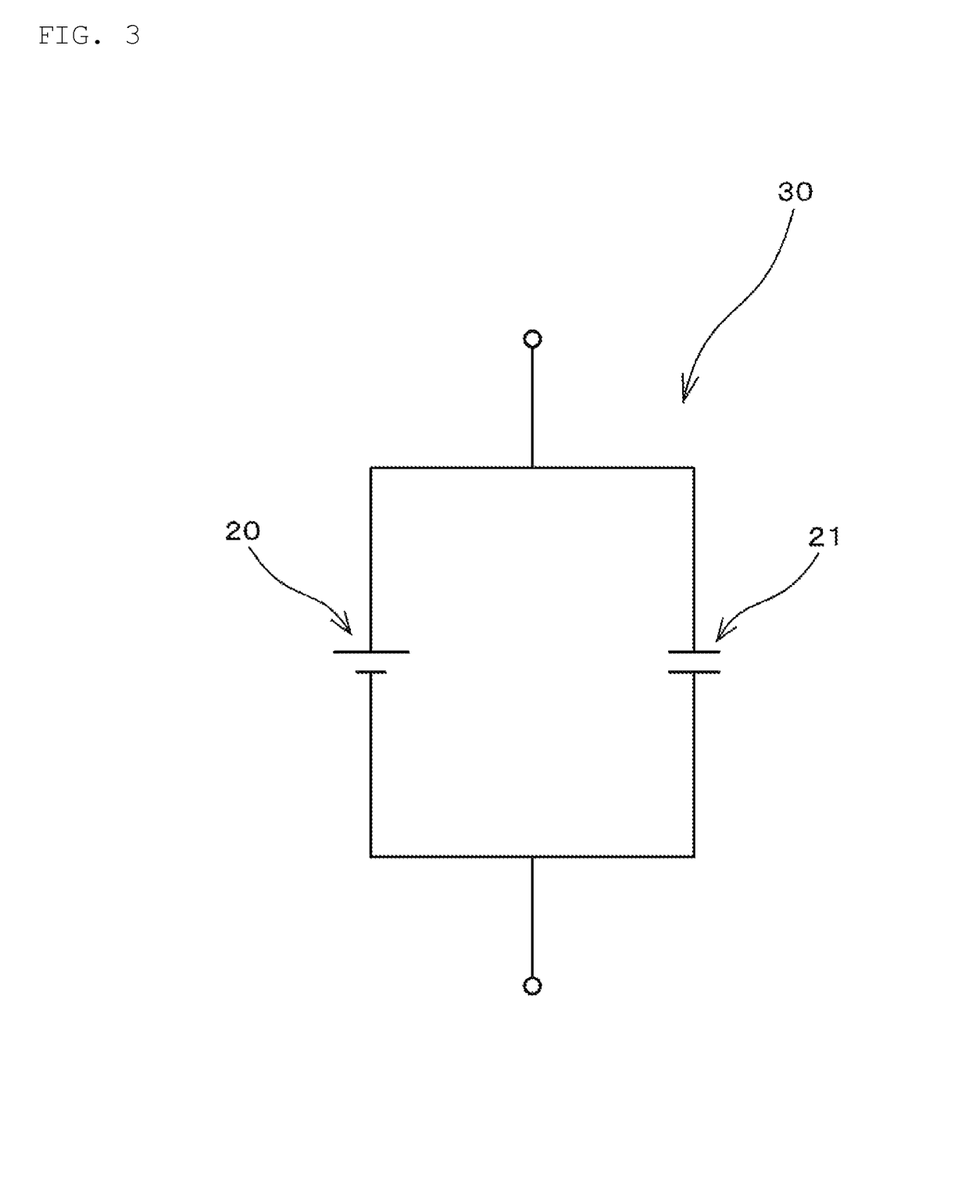
FIG. 3 is a diagram illustrating the configuration of a storage circuit according to an embodiment (Embodiment 2) of the present invention.

FIG. 3 is a diagram illustrating the configuration of a storage circuit 30 using a non-aqueous electrolyte secondary battery according to the present invention.

This storage circuit according to Embodiment 2 is formed by connecting a non-aqueous electrolyte secondary battery 20 and an electric double layer capacitor 21 in parallel as shown in FIG. 3.

As the non-aqueous electrolyte secondary battery 20, a non-aqueous electrolyte secondary battery is used which meets the requirements of the present invention as prepared according to Embodiment 1 as described above.

In addition, as the electric double layer capacitor 21, for example, a structure of a stacked body housed in an exterior material along with an electrolyte solution of 1 mol/l of triethylmethylammoniumtetrafluoroborate dissolved in propylene carbonate, where the stacked body is obtained by stacking a positive electrode and a negative electrode with a separator interposed therebetween, an electrode obtained by providing, as a positive electrode active material layer, a combination layer including a carbon material (for example, activated carbon) on aluminum foil as a positive electrode current collector layer is used as the positive electrode, and an electrode obtained by providing, as a negative electrode active material layer, a combination layer including a carbon material (for example, activated carbon) on aluminum foil as a negative electrode current collector layer is used as the negative electrode, that is, the electric double layer capacitor 21 can be used which has a structure based in the structure of the non-aqueous electrolyte battery 20 in FIG. 2.

It is to be noted that the configuration of the electric double layer capacitor is not particularly limited, but it is possible to use any configuration by appropriate selection from various known configurations.

Further, in the storage circuit 30 according to the present invention, it is also possible to provide a control circuit such as a bypass circuit for bypassing the current so as to keep from further charging when the electric double layer capacitor 21 reaches a predetermined charging voltage.

In the storage circuit 30 configured as described above, the non-aqueous electrolyte secondary battery according to the present invention is used as the non-aqueous electrolyte secondary battery 20, and the non-aqueous electrolyte secondary battery 20 has performance hardly degraded as described above in Embodiment 1. Thus, the storage circuit 30 composed of the non-aqueous electrolyte secondary battery 20 and the electric double layer capacitor 21 connected in parallel also has reliability improved dramatically.

It is to be noted that the present invention is not to be considered limited to the embodiments described above, but various applications and modifications can be made within the scope of the invention, in regard to the compositions of the positive electrode and negative electrode, the specific compositions of the positive electrode active material, negative electrode active material, and the like, the composition of the separator, the type of the non-aqueous electrolyte, etc.

DESCRIPTION OF REFERENCE SYMBOLS 10 battery element
11 positive electrode
12 negative electrode
13 separator
14,15 lead tab
16,17 sealant
18 exterior material
20 non-aqueous electrolyte secondary battery
21 electric double layer capacitor
30 storage circuit

The invention claimed is:

1. A non-aqueous electrolyte secondary battery comprising:
   a positive electrode having a positive electrode active material layer and a positive electrode current collector;
   a negative electrode having a negative electrode active material layer and a negative electrode current collector;
   a separator interposed between the positive electrode and the negative electrode;
   a non-aqueous electrolyte solution; and
   an exterior material enclosing the positive electrode, the negative electrode, the separator and the non-aqueous electrolyte solution, wherein:
   the positive electrode active material layer comprises a lithium transition metal oxide having a layered crystal structure;
   the negative electrode active material layer comprises a lithium titanium oxide having a spinel-type crystal structure, and a thickness of 20.0 μm or more and 27.8 μm or less;
   a ratio between a thickness of the positive electrode active material layer and the thickness of the negative electrode active material is 0.59 ≤(thickness of positive electrode active material layer/thickness of negative electrode active material layer)≤1.50; and
   an electric capacity of the positive electrode is higher than an electric capacity of the negative electrode.

2. The non-aqueous electrolyte secondary battery according to claim 1, wherein the lithium transition metal oxide is a lithium composite oxide.

3. The non-aqueous electrolyte secondary battery according to claim 2, wherein the lithium composite oxide is one of $LiCoO_2$ and $LiCo_{1/3}Ni_{1/3}Mn_{1/3}O_2$.

4. The non-aqueous electrolyte secondary battery according to claim 1, wherein the separator is a porous material.

5. The non-aqueous electrolyte secondary battery according to claim 4, wherein the porous material is polyamideimide.

6. The non-aqueous electrolyte secondary battery according to claim 1, wherein the electrolyte solution is selected from $LiPF_6$, $LiBF_4$, LiTFSI, and mixtures thereof, dissolved in an organic solvent.

7. The non-aqueous electrolyte secondary battery according to claim 6, wherein the organic solvent is selected from the group consisting of dimethyl carbonate, diethyl carbonate, methylethyl carbonate, propylene carbonate, acetonitrile, ethyl propionate, methyl propionate, and mixtures thereof.

8. The non-aqueous electrolyte secondary battery according to claim 1, wherein the electrolyte solution comprises an electrolyte dissolved in an ionic liquid.

9. The non-aqueous electrolyte secondary battery according to claim 8, wherein the ionic liquid is selected from the group consisting of 1-ethyl-3-methylimidazolium tetrafluoroborate, 1-ethyl-3-methylimidazolium bis(trifluoromethane sulfonyl), and mixtures thereof.

10. A storage circuit comprising:
    the non-aqueous electrolyte secondary battery according to claim 1; and
    an electric double layer capacitor connected in parallel to the non-aqueous electrolyte secondary battery.

11. A non-aqueous electrolyte secondary battery comprising:
    a positive electrode having a positive electrode active material layer and a positive electrode current collector;
    a negative electrode having a negative electrode active material layer and a negative electrode current collector;
    a separator interposed between the positive electrode and the negative electrode;
    a non-aqueous electrolyte solution; and
    an exterior material enclosing the positive electrode, the negative electrode, the separator and the non-aqueous electrolyte solution, wherein:
    the positive electrode active material layer comprises a lithium transition metal oxide having a layered crystal structure;
    the negative electrode active material layer comprises a lithium titanium oxide having a spinel-type crystal structure, and having a thickness of 25.0 μm or more and 27.8 μm or less;
    a ratio between a thickness of the positive electrode active material layer and the thickness of the negative electrode active material layer is 0.59 ≤(thickness of positive electrode active material layer/thickness of negative electrode active material layer)≤1.14; and an electric capacity of the positive electrode is higher than an electric capacity of the negative electrode.

12. The non-aqueous electrolyte secondary battery according to claim 11, wherein the lithium transition metal oxide is a lithium composite oxide.

13. The non-aqueous electrolyte secondary battery according to claim 12, wherein the lithium composite oxide is one of $LiCoO_2$ and $LiCo_{1/3}Ni_{1/3}Mn_{1/3}O_2$.

14. The non-aqueous electrolyte secondary battery according to claim 11, wherein the separator is a porous material.

15. The non-aqueous electrolyte secondary battery according to claim 14, wherein the porous material is polyamideimide.

16. The non-aqueous electrolyte secondary battery according to claim 11, wherein the electrolyte solution is selected from $LiPF_6$, $LiBF_4$, LiTFSI, and mixtures thereof, dissolved in an organic solvent.

17. The non-aqueous electrolyte secondary battery according to claim 16, wherein the organic solvent is selected from the group consisting of dimethyl carbonate, diethyl carbonate, methylethyl carbonate, propylene carbonate, acetonitrile, ethyl propionate, methyl propionate, and mixtures thereof.

18. The non-aqueous electrolyte secondary battery according to claim 11, wherein the electrolyte solution comprises an electrolyte dissolved in an ionic liquid.

19. The non-aqueous electrolyte secondary battery according to claim 18, wherein the ionic liquid is selected from the group consisting of 1-ethyl-3-methylimidazolium tetrafluoroborate, 1-ethyl -3-methylimidazolium bis(trifluoromethane sulfonyl), and mixtures thereof.

20. A storage circuit comprising:
the non-aqueous electrolyte secondary battery according to claim 11; and
an electric double layer capacitor connected in parallel to the non-aqueous electrolyte secondary battery.

* * * * *